(12) United States Patent
Ou et al.

(10) Patent No.: US 8,397,594 B2
(45) Date of Patent: Mar. 19, 2013

(54) FEED DRIVE MECHANISM AND CONNECTING ASSEMBLY THEREOF

(75) Inventors: Feng-Ming Ou, Taichung (TW); Jen-Ji Wang, Taichung (TW); Shih-Chang Chen, Hsinchu County (TW); Chien-Chih Chiu, Taipei County (TW); Yi-Huang Liou, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 576 days.

(21) Appl. No.: 12/629,538

(22) Filed: Dec. 2, 2009

(65) Prior Publication Data

US 2011/0048146 A1 Mar. 3, 2011

(30) Foreign Application Priority Data

Aug. 28, 2009 (TW) .............................. 98129144 A

(51) Int. Cl.
*F16H 25/22* (2006.01)
(52) U.S. Cl. .................. 74/89.23; 74/89.32
(58) Field of Classification Search ................ 74/89.32, 74/89.33, 89.34, 89.44, 89.14, 424.71, 424.78, 74/424.79, 424.81, 424.82, 424.83, 424.92, 74/424.93; *F16H 25/20, 25/24, 25/22*
See application file for complete search history.

(56) References Cited

U.S. PATENT DOCUMENTS

| | | | | |
|---|---|---|---|---|
| 2,775,105 A * | 12/1956 | Banker | .......................... | 464/101 |
| 3,720,116 A * | 3/1973 | Better et al. | .................. | 74/89.42 |
| 4,535,660 A * | 8/1985 | Osterman | ........................ | 82/148 |
| 4,660,431 A * | 4/1987 | Heine | .......................... | 74/89.42 |
| 5,644,951 A * | 7/1997 | Hatamura | ..................... | 74/89.42 |
| 5,716,300 A * | 2/1998 | Sammataro et al. | .......... | 475/346 |
| 5,809,838 A * | 9/1998 | Miyaguchi et al. | ........... | 74/89.44 |
| 6,817,260 B2 | 11/2004 | Liao | | |
| 6,923,603 B2 | 8/2005 | Muto | | |
| 7,114,895 B2 | 10/2006 | Kojima et al. | | |
| 7,273,335 B2 | 9/2007 | Furuhashi et al. | | |
| 7,634,952 B2 * | 12/2009 | Chen et al. | .................... | 74/89.44 |
| 2002/0097930 A1* | 7/2002 | Lee et al. | ...................... | 384/106 |
| 2002/0152822 A1* | 10/2002 | Chuo | .......................... | 74/89.13 |
| 2002/0172733 A1* | 11/2002 | Takanohashi et al. | ........ | 425/107 |
| 2003/0089187 A1* | 5/2003 | Liao | .......................... | 74/424.81 |

FOREIGN PATENT DOCUMENTS

| | | |
|---|---|---|
| JP | 60039034 | 2/1985 |
| JP | 2152702 A | 6/1990 |
| JP | 4269138 A | 9/1992 |
| JP | 10118885 A | 5/1998 |

(Continued)

*Primary Examiner* — Troy Chambers
*Assistant Examiner* — Valentin Craciun
(74) *Attorney, Agent, or Firm* — Morris Manning & Martin LLP; Tim Tingkang Xia, Esq.

(57) ABSTRACT

A feed drive mechanism and a connecting assembly thereof are described. The connecting assembly includes a main body and an outer sleeve. The main body has a connecting plate and an inner sleeve connected to a side surface of the connecting plate. Two opposite side surfaces of the connecting plate are respectively fixed on a screw nut seat and a lead screw nut of the feed drive mechanism, and a channel surrounds an outer side surface of the inner sleeve. The outer sleeve is sleeved on the outer side surface of the inner sleeve, enables the channel to be formed into a sealed space, and has an inlet and an outlet respectively communicating with the channel, thereby injecting a cooling medium into the channel.

18 Claims, 21 Drawing Sheets

(4 of 21 Drawing Sheet(s) Filed in Color)

FOREIGN PATENT DOCUMENTS

| | | |
|---|---|---|
| JP | 10235536 A | 9/1998 |
| JP | 11267938 | 10/1999 |
| JP | 2002346860 A | 12/2002 |
| JP | 2003080439 A | 3/2003 |
| JP | 2003145373 A | 5/2003 |
| JP | 2003300122 A | 10/2003 |
| JP | 2004249434 A | 9/2004 |
| JP | 2005133764 A | 5/2005 |
| JP | 2008298254 A | 12/2008 |
| TW | 521808 | 2/2003 |
| TW | I230232 | 4/2005 |
| TW | I287073 | 4/2005 |
| TW | I262264 | 9/2006 |
| TW | M322490 | 11/2007 |
| TW | M329128 | 3/2008 |
| TW | I298282 B | 7/2008 |
| TW | I300375 B | 9/2008 |
| TW | M354669 | 4/2009 |
| TW | I310436 B | 6/2009 |
| TW | I361124 | 4/2012 |

\* cited by examiner

FEED DRIVE MECHANISM AND CONNECTING ASSEMBLY THEREOF

CROSS-REFERENCE TO RELATED APPLICATIONS

This non-provisional application claims priority under 35 U.S.C. §119(a) on Patent Application No(s). 098129144 filed in Taiwan, R.O.C. on Aug. 28, 2009, the entire contents of which are hereby incorporated by reference.

BACKGROUND OF THE INVENTION

1. Field of the Invention

The present invention relates to a feed drive mechanism, and more particularly to a feed drive mechanism having a connecting assembly.

2. Related Art

Currently, relevant products produced in the semiconductor industry, panel industry, biochip industry, and other industries have developed towards a new trend of being light, thin, short, and small, for example, micro-pores, micro-channels, V-shaped channels, shaped holes, and other elements with fine features, and the sizes thereof are mostly between several micrometers and hundreds of micrometers, such that a feeding accuracy of a feeding mechanism of a table for manufacturing such products must be improved accordingly, so as to meet the hyperfine processing demands.

FIGS. 1 and 2 are schematic views of a feed drive mechanism in the prior art. A conventional feed drive mechanism 10 is installed on a processing machinery frame 20, and two guide rails 21 spaced apart from each other and a movable base 22 connected to the feed drive mechanism 10 are disposed on the processing machinery frame 20. The movable base 22 may be disposed on the guide rails 21 in a movable relation, and may be moved reciprocally relative to the processing machinery frame 20.

Referring to FIGS. 1 and 2, the conventional feed drive mechanism 10 includes a bearing tailstock 11, a lead screw 12, a screw nut seat 13, a lead screw nut 14, a connecting plate 15, and a motor 16. The bearing tailstock 11 is fixed on the processing machinery frame 20. One end of the lead screw 12 is disposed on the bearing tailstock 11, and the other end thereof is connected to the motor 16, in which a disposing direction of the lead screw 12 is parallel to the guide rails 21. The screw nut seat 13 is sleeved on the lead screw 12 and combined with the movable base 22. The lead screw nut 14 is disposed in the screw nut seat 13 and sleeved on the lead screw 12. One end of the lead screw nut 14 is exposed out of the screw nut seat 13. The connecting plate 15 is sleeved on the lead screw 12 and combined and fixed with the screw nut seat 13 and the lead screw nut 14. When driving the lead screw 12 to rotate, the motor 16 drives the screw nut seat 13 and the movable base 22 together to reciprocally move towards a direction parallel to the guide rails 21, so as to achieve an accurate positioning function.

During the assembling process, the conventional feed drive mechanism unavoidably produces an assembly accuracy error, so that the feed drive mechanism cannot achieve a high assembling accuracy. For example, a micro-feed stick-slip phenomenon occurs due to a poor parallelism between the lead screw and the guide rails, a dead weight droop occurs due to an excessively large length of the lead screw, and other assembly errors may exist. As a result, a positioning accuracy of the feed drive mechanism cannot approach the ideal level, thereby seriously affecting the accuracy in the processing dimension. The connecting plate is disposed, which aims at repairing a sealing degree between the lead screw nut and the screw nut seat, instead of achieving the high accuracy and modifying the feeding errors for the feed drive mechanism.

During the operating process of the feed drive mechanism, balls (not shown) disposed inside the feed drive mechanism freely roll between the lead screw nut and the lead screw. Due to the high speed friction, the temperature of the lead screw nut and the lead screw quickly rises, and the parts of the feed drive mechanism are deformed due to the excessively high temperature, thereby resulting in a poor positioning accuracy.

In order to solve the heat error problem of the feed drive mechanism to relieve the influence of the temperature variation on the accuracy of the feed drive mechanism, in U.S. Pat. No. 6,817,260 and Taiwan Patent No. 1287073, a technical solution of designing a cooling device in a lead screw nut of a feed drive mechanism is disclosed, thereby lowering the high temperature generated when the feed drive mechanism is operated.

However, a cooling device of the conventional feed drive mechanism is directly designed on the lead screw nut, which has the following problems.

1. In order to meet the high rigidity and high accuracy requirements for the feed drive mechanism, the processing accuracy requirements for the lead screw nut must be increased accordingly, thereby resulting in a high manufacturing cost, complicated manufacturing procedures, and a long manufacturing time.

2. The cooling device is additionally disposed within the lead screw nut, such that a size and a type of the lead screw nut originally as the specification product are forced to be changed, such that the lead screw nut has a poor interchangeability, and it is inconvenient for subsequent maintenance.

3. The lead screw nut designed with the cooling device still cannot meet the high assembly accuracy requirements for the feed drive mechanism.

SUMMARY OF THE INVENTION

In view of the above problems, the present invention is a feed drive mechanism and a connecting assembly thereof, thereby solving problems of a conventional feed drive mechanism resulting from a cooling structure disposed in a lead screw nut, for example, a size change, complicated manufacturing procedures, an excessively high cost, and a poor assembly accuracy, and problems of the conventional feed drive mechanism resulting from assembly accuracy errors, for example, a dead weight droop of a lead screw, a poor parallelism, and a micro-feed stick-slip.

The present invention provides a feed drive mechanism, which comprises a screw nut seat, a lead screw nut, and a connecting assembly, in which the connecting assembly has a main body and an outer sleeve. The main body has a connecting plate and an inner sleeve. The connecting plate has a first side surface and a second side surface opposite to each other, which are respectively fixed on the lead screw nut and the screw nut seat. The inner sleeve is connected to the second side surface of the main body, and a channel surrounds an outer side surface of the inner sleeve. The outer sleeve is sleeved on the outer side surface of the inner sleeve, enables the channel to be formed into a sealed space, and has an inlet and an outlet respectively communicating with the channel, such that a cooling medium is injected into the channel through the inlet and the outlet.

The connecting plate of the connecting assembly according to the present invention further comprises a first portion, a second portion, and a plurality of elastic slots separated from one another. The first portion is connected to the second portion in a radial direction, the first portion is axially fixed on the screw nut seat, and the second portion is axially fixed on the lead screw nut. The elastic slots are located between the first portion and the second portion and axially penetrate the connecting plate, and one ends of each two neighboring elastic slots respectively have an overlapped laminating segment, such that the flexible connecting plate has an elastic deforming characteristic in the radial direction.

In the present invention, the cooling structure is directly designed on the connecting assembly, and an entire structure design is quite simple, such that it is easily manufactured through mass production, so as to lower a manufacturing cost. Furthermore, the lead screw nut of the feed drive mechanism does not require a cooling structure, such that the lead screw nut maintains a size and a type of an original specification product, so as to improve the assembly and interchangeability features of the feed drive mechanism, which is convenient for the subsequent maintenance and replacement of parts.

In addition, the connecting plate of the connecting assembly according to the present invention has the elastic slots penetrating there through, and one ends of the two neighboring elastic slots are relatively overlapped, such that the connecting assembly has the elastic deforming capability in the radial direction, thereby modifying a non-parallelism of the feed drive mechanism resulting from the assembly errors, and improving a feeding accuracy of the feed drive mechanism. The flexible connecting plate still has a high rigidity characteristic in an axial direction, which is sufficient for driving the feed drive mechanism.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The present invention will become more fully understood from the detailed description given herein below for illustration only, and thus are not limitative of the present invention, and wherein.

DETAILED DESCRIPTION OF THE INVENTION

Figure 1:
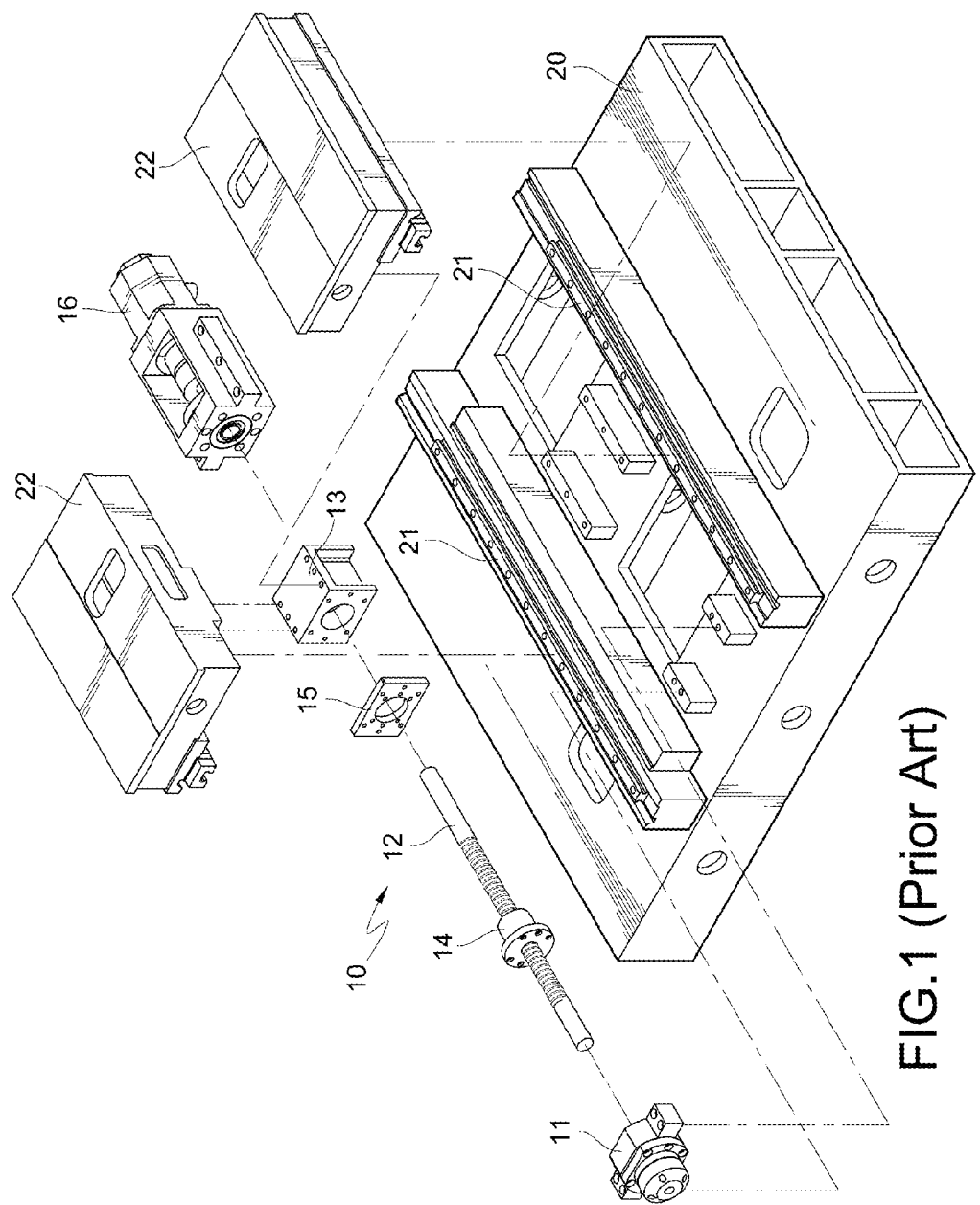
FIG. 1 is an exploded view of a feed drive mechanism in the prior art.
Figure 2:
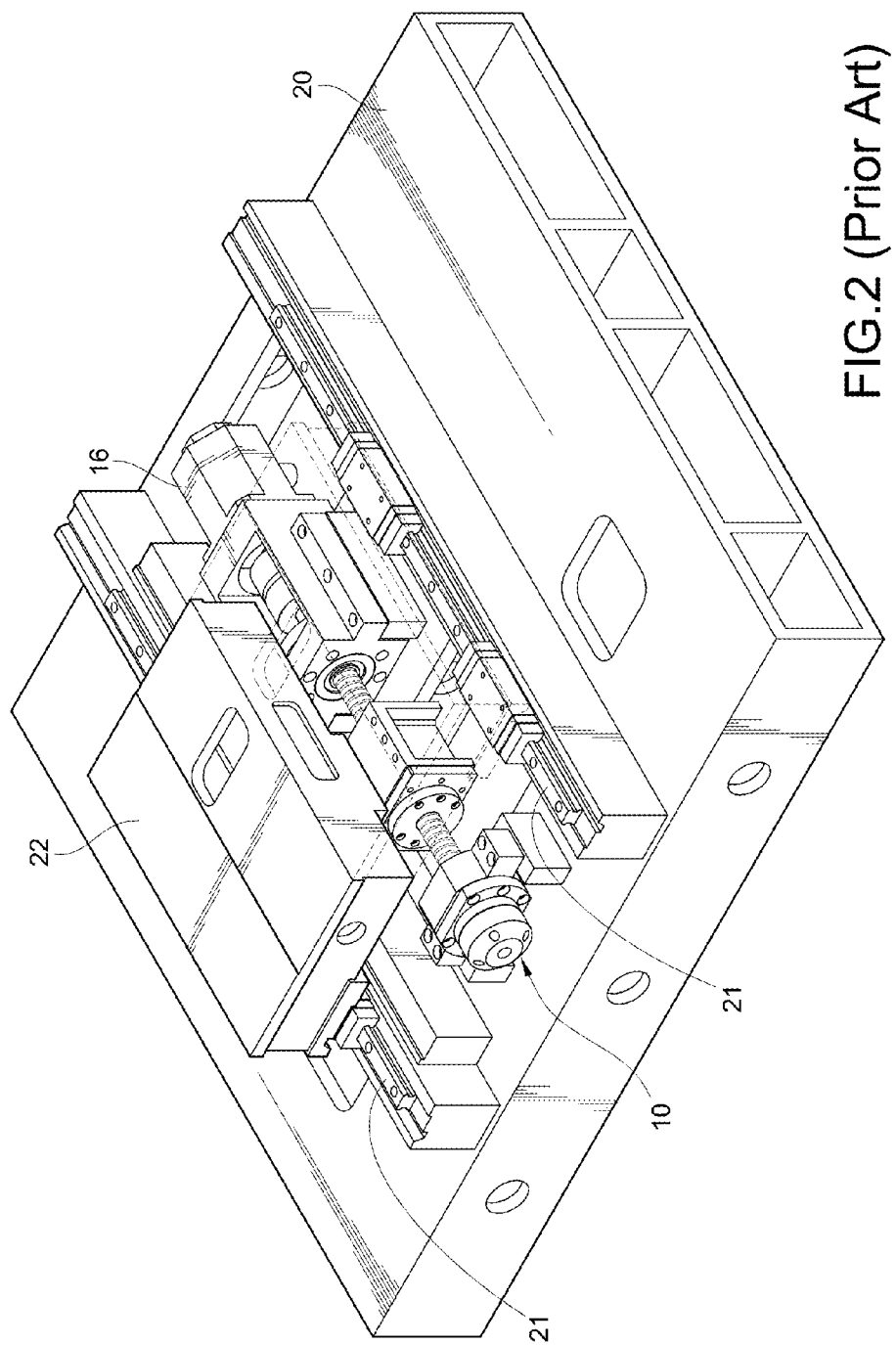
FIG. 2 is schematic view of the feed drive mechanism in the prior art.
Figure 3:
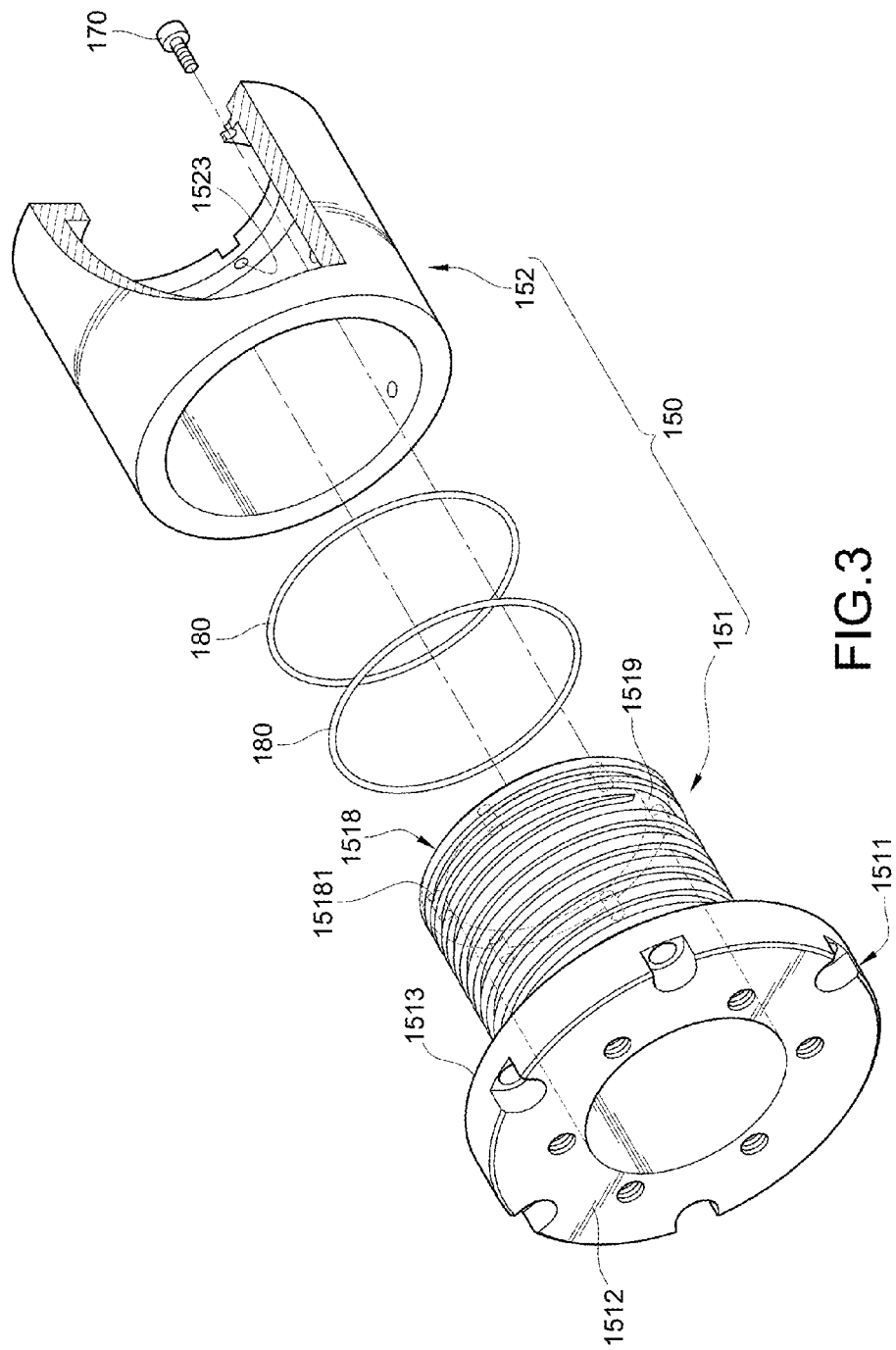
FIG. 3 is an exploded view of a connecting assembly according to a first embodiment of the present invention.
Figure 4:
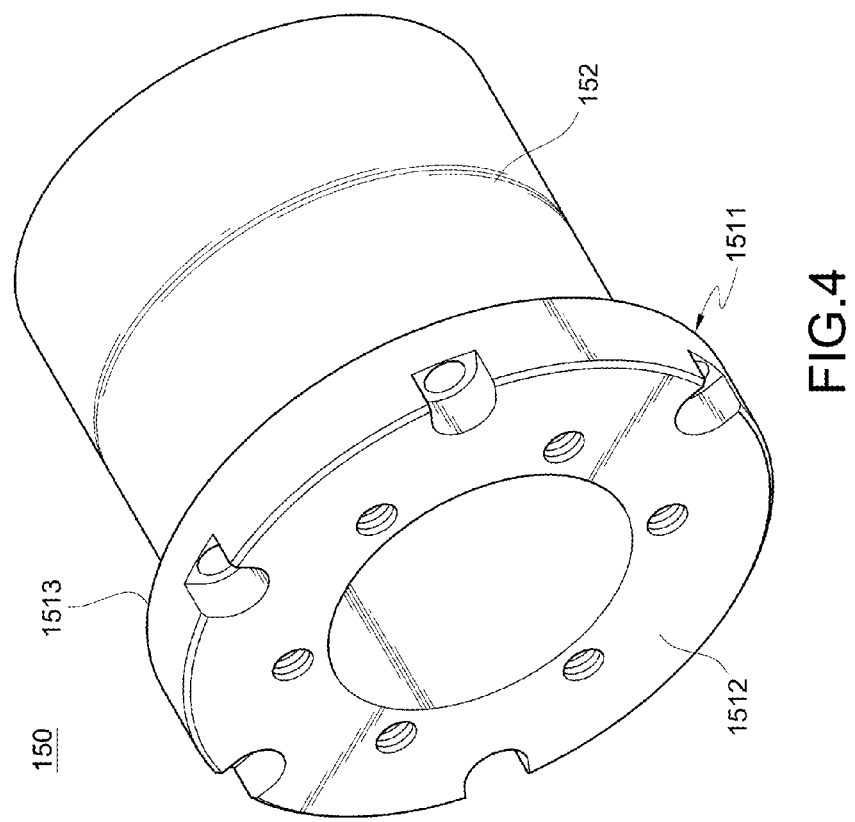
FIG. 4 is a schematic view of the connecting assembly according to the first embodiment of the present invention.
Figure 5:
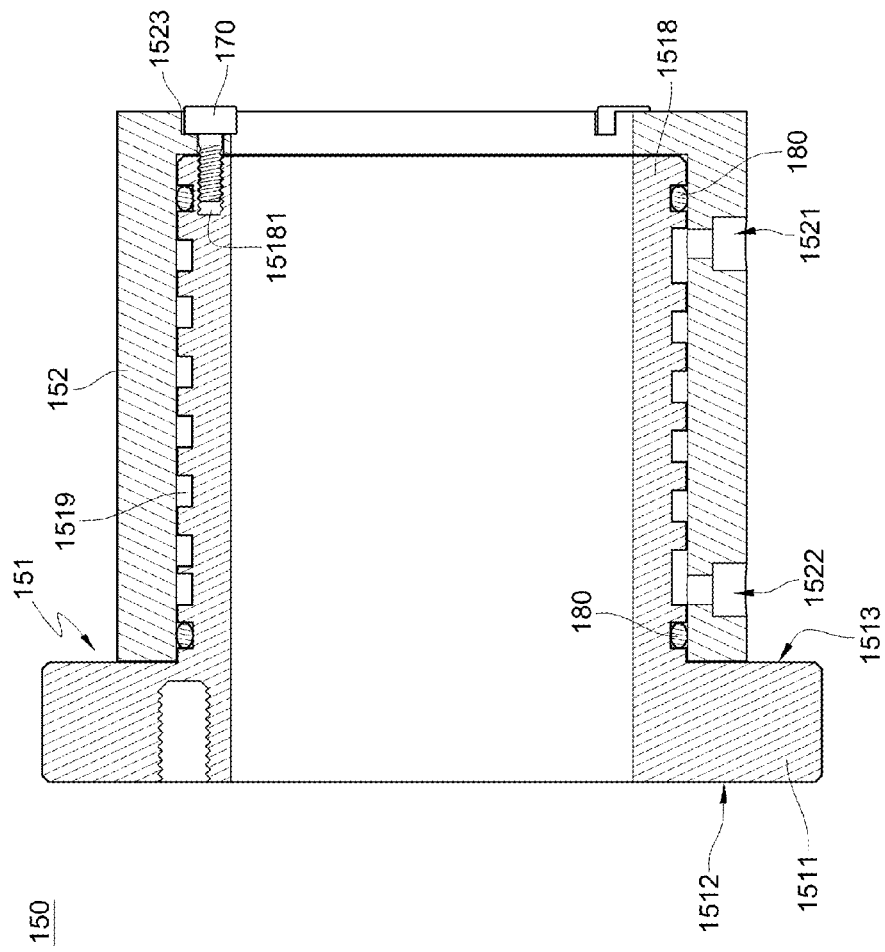
FIG. 5 is a schematic cross-sectional view of the connecting assembly according to the first embodiment of the present invention.

Referring to FIGS. 3 to 5, a connecting assembly 150 according to a first embodiment of the present invention comprises a main body 151 and an outer sleeve 152. The main body 151 has a connecting plate 1511 and an inner sleeve 1518. The connecting plate 1511 further has a first side surface 1512 and a second side surface 1513 opposite to each other. The inner sleeve 1518 is connected to the second side surface 1513 of the connecting plate 1511, and a channel 1519 surrounds an outer side surface of the inner sleeve 1518. The channel 1519 of this embodiment is in a spiral shape, and surrounds the outer side surface of the inner sleeve 1518, such that the channel 1519 is uniformly distributed on the outer side surface of the inner sleeve 1518.

In addition, the connecting plate 1511 and the inner sleeve 1518 of the main body 151 of the present invention are configured into an integrally formed structure. However, persons skilled in the art may combine the connecting plate 1511 with the inner sleeve 1518 in a soldering manner or a screwing manner.

Referring to FIGS. 3 to 5, an inlet 1521 and an outlet 1522 are respectively opened on two opposite end portions of the outer sleeve 152, and are connected to a cooling medium temperature control device (not shown). The outer sleeve 152 is sleeved on the outer side surface of the inner sleeve 1518, and an inner diameter size of the outer sleeve 152 matches with an outer diameter size of the inner sleeve 1518. Thus, when the outer sleeve 152 is sleeved outside the inner sleeve 1518, an inner side surface of the outer sleeve 152 is attached to the outer side surface of the inner sleeve 1518, such that the channel 1519 on the inner sleeve 1518 is formed into a sealed space, and the channel 1519 only communicates with the inlet 1521 and the outlet 1522. The cooling medium temperature control device (not shown) injects the cooling medium into the channel 1519 via the inlet 1521, and the cooling medium flows back to the cooling medium temperature control device (not shown) via the outlet 1522, such that the cooling medium uniformly flows through the outer side surface of the inner sleeve 1518, thereby forming a complete cooling loop. Through a temperature control of the cooling medium temperature control device, a flow quantity or a flow speed of the cooling medium injected into the channel 1519 are correspondingly adjusted. The cooling medium of this embodiment may be cooling water, cooling oil, or compressed air, but the present invention is not limited here.

The outer sleeve 152 has a plurality of third fixing holes 1523, and the inner sleeve 1518 has a plurality of third combining holes 15181 corresponding to the third fixing holes 1523. A plurality of locking elements 170, for example, screw bolts, passes through the third fixing holes 1523 and is locked in the third combining holes 15181, such that the outer sleeve 152 is fixed on the inner sleeve 1518 without being loosed, thereby preventing the cooling medium from overflowing.

The connecting assembly 150 of the present invention further comprises two sealing parts 180, disposed on two opposite end surfaces of the outer sleeve 152. When the outer sleeve 152 is sleeved outside the inner sleeve 1518, the sealing parts 180 are embedded between the outer sleeve 152 and the inner sleeve 1518 and provide a sealing function, so as to avoid leakage of the cooling medium in the channel 1519. The sealing parts 180 of the present invention may be oil seals or O-rings, but the present invention is not limited here.

Figure 6B:
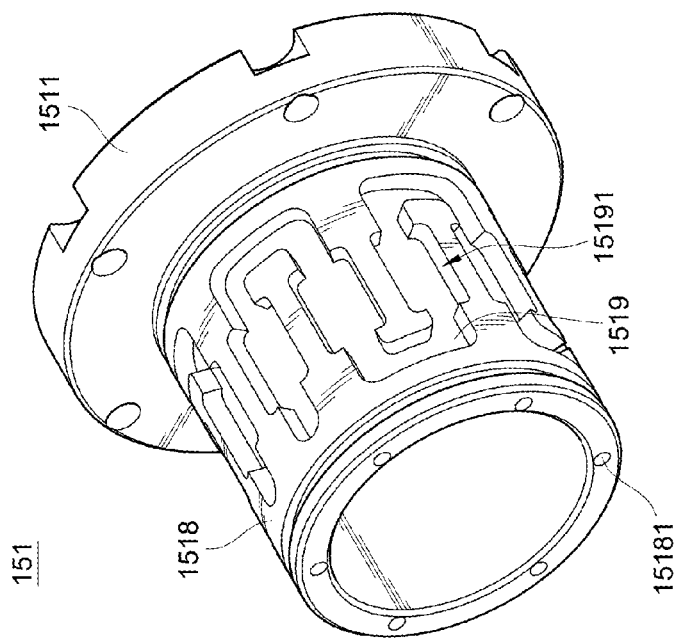
FIG. 6B is a schematic view of a channel in a different type according to the present invention.
Figure 6A:
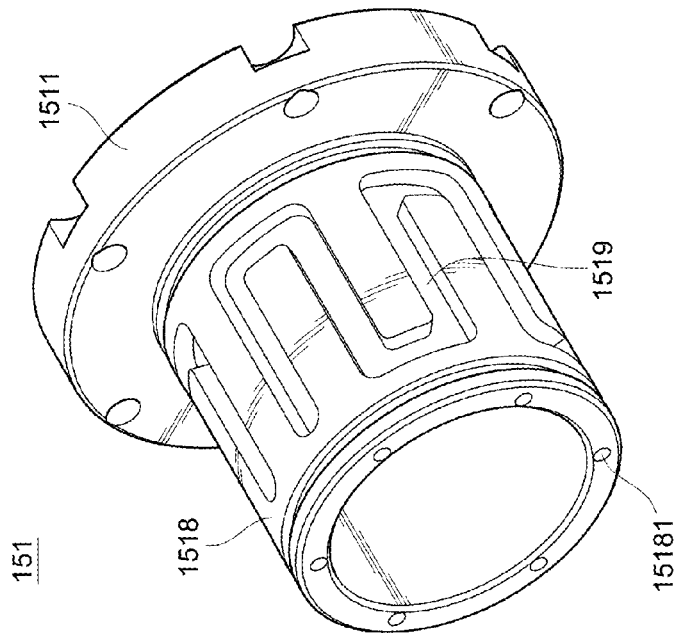
FIG. 6A is a schematic view of a channel in a different type according to the present invention.

FIGS. 6A and 6B are schematic views of channels in different types. In addition to the spiral-shaped configuration as shown in FIG. 3, the channel 1519 on the inner sleeve 1518 of the present invention may be further designed into a repeatedly folded configuration on the outer side surface of the inner sleeve 1518, such that the cooling medium uniformly dissipates the heat on the surface of the inner sleeve 1518. Furthermore, each bent segment of the channel 1519 further has an expansion portion 15191, so as to enlarge a heat dissipation area of the channel 1519.

Figure 7:
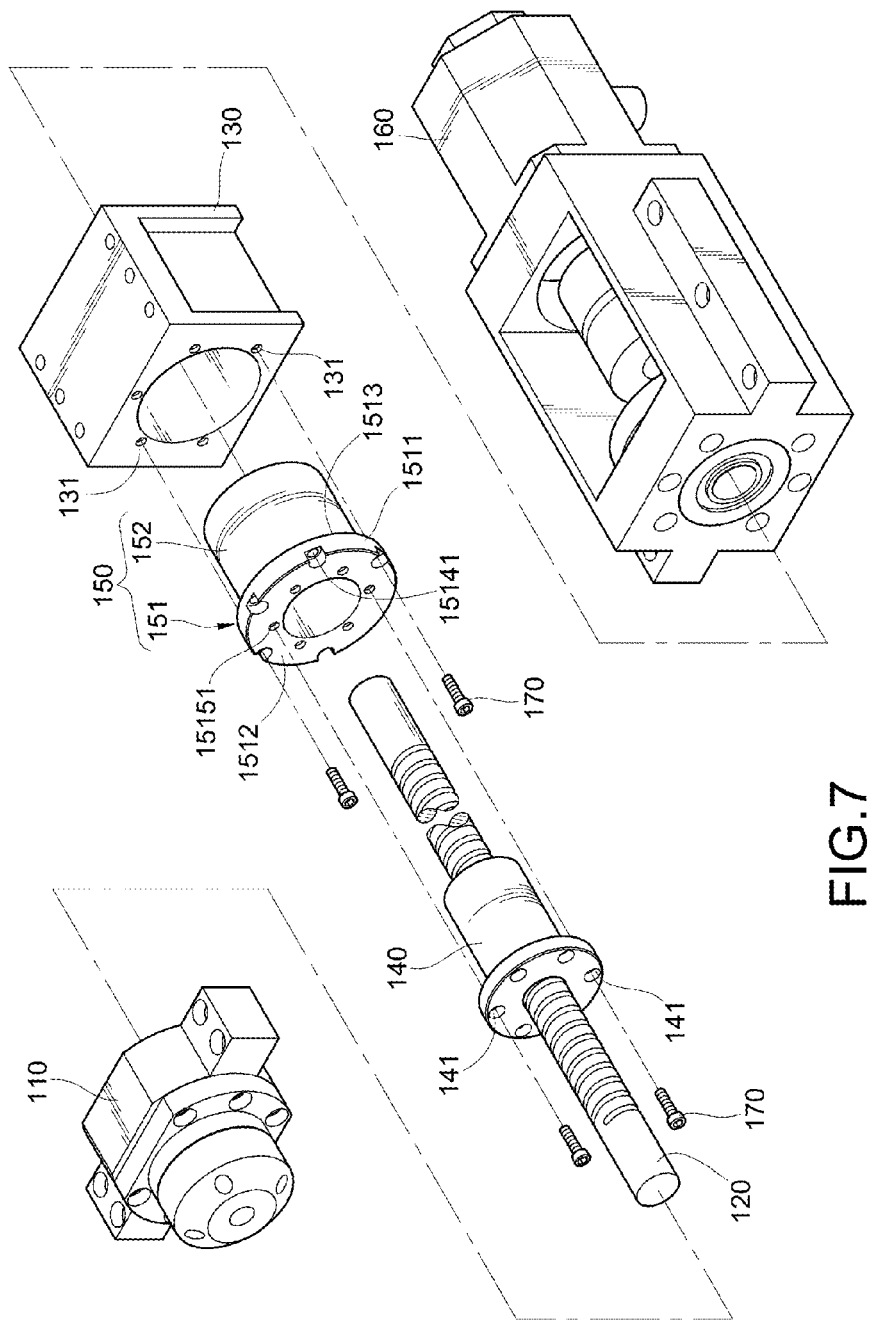
FIG. 7 is an exploded view of a feed drive mechanism according to the first embodiment of the present invention.
Figure 8:
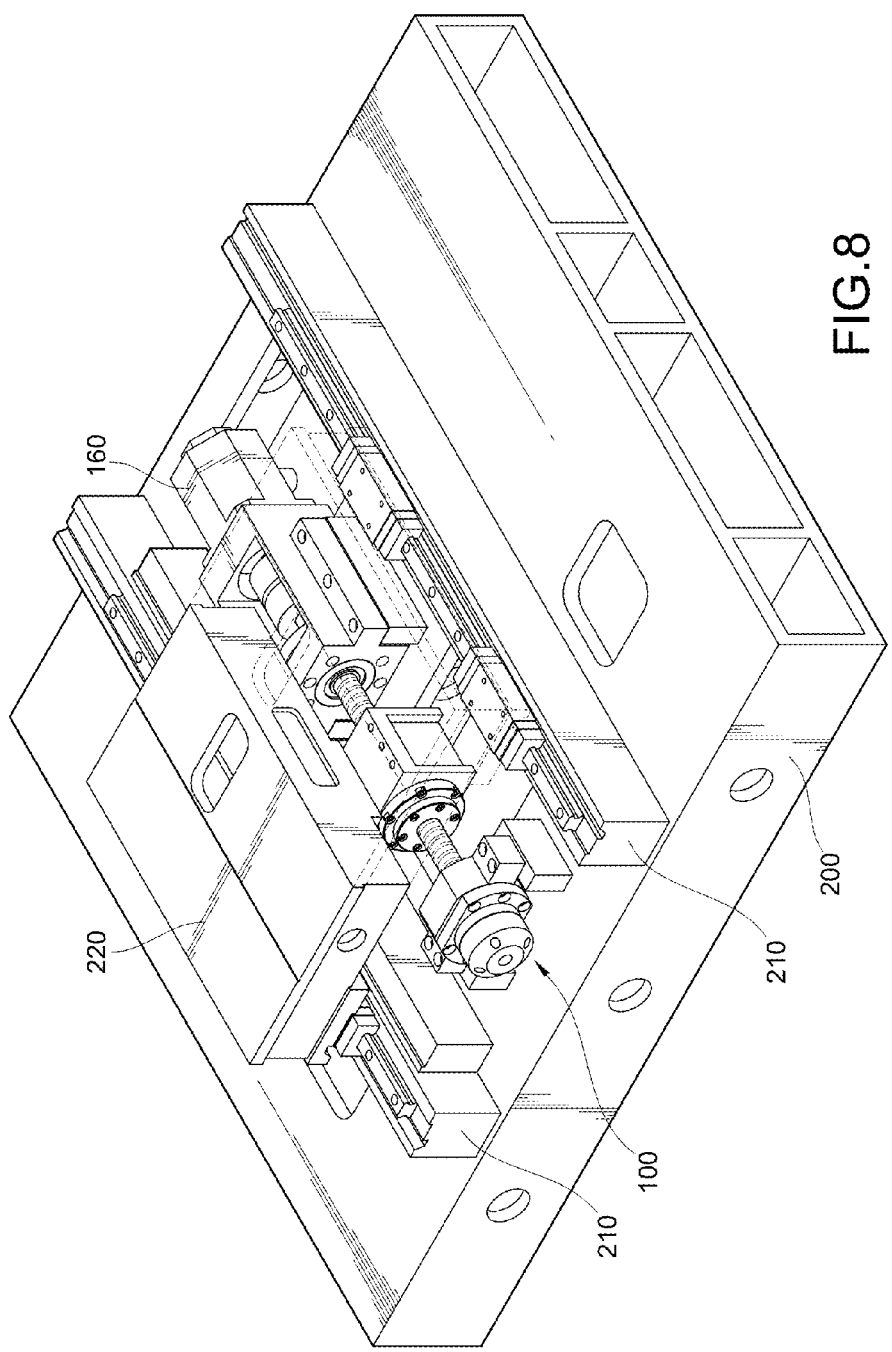
FIG. 8 is a schematic view of the feed drive mechanism according to the first embodiment of the present invention.

FIGS. 7 and 8 are schematic three-dimensional views of a feed drive mechanism according to the first embodiment. Referring to FIGS. 7 and 8, a feed drive mechanism 100 according to the first embodiment of the present invention is installed on a base 200, in which the base 200 may be a saddle of a comprehensive processing machinery table. The base 200 further comprises guide rails 210 neighboring to the feed drive mechanism 100 and a movable base 220 connected to the feed drive mechanism 100. The movable base 220 is disposed on the guide rails 210 in a movable relation and moves reciprocally relative to the base 200.

Referring to FIGS. 7 and 8, the feed drive mechanism 100 according to the first embodiment of the present invention comprises a bearing tailstock 110, a lead screw 120, a screw nut seat 130, a lead screw nut 140, a connecting assembly 150, and a motor 160. The bearing tailstock 110 is fixed on the base 200. One end of the lead screw 120 is disposed on the bearing tailstock 110, and the other end of the lead screw 120 is connected to the motor 160, in which a disposing direction of the lead screw 120 is parallel to the guide rails 210 and a moving direction of the movable base 220. The screw nut seat 130 is movably sleeved on the lead screw 120, and is combined with the movable base 220. The lead screw nut 140 is disposed in the screw nut seat 130 and movably sleeved on the lead screw 120, and one end of the lead screw nut 140 is exposed out of the screw nut seat 130. The main body 151 of the connecting assembly 150 is sleeved on the lead screw 120, and the first side surface 1512 and the second side surface 1513 of the connecting plate 1511 of the connecting assembly 150 are respectively attached to the lead screw nut 140 and the screw nut seat 130.

Referring to FIGS. 7 and 8, the connecting plate 1511 of the connecting assembly 150 is substantially divided into an outer circle region and an inner circle region. The outer circle region of the connecting plate 1511 has a plurality of first fixing holes 15141, and the screw nut seat 130 has a plurality of first combining holes 131 corresponding to the first fixing holes 15141. The plurality of locking elements 170, for example, screw bolts, respectively passes through the first fixing holes 15141 and is locked in the first combining holes 131, such that the connecting plate 1511 is axially fixed on the screw nut seat 130. The inner circle region of the connecting plate 1511 has a plurality of second fixing holes 15151, and the lead screw nut 140 has a plurality of second combining holes 141 corresponding to the second fixing holes 15151. The plurality of locking elements 170, for example, screw bolts, respectively passes through the second fixing holes 15151 and is locked in the second combining holes 141, such that the lead screw nut 140 is axially fixed on the connecting plate 1511.

It should be noted that, in the combining means of the present invention, the second side surface 1513 of the connecting plate 1511 is combined with the screw nut seat 130, and the first side surface 1512 of the connecting plate 1511 is combined with the lead screw nut 140, so that the connecting assembly 150 is axially fixed between the screw nut seat 130 and the lead screw nut 140. Persons skilled in the art may design various different combining means to fix the connecting assembly 150 between the screw nut seat 130 and the lead screw nut 140, and the present invention is not limited here.

Referring to FIGS. 7 and 8, as well as the schematic cross-sectional view of FIG. 5, in the driving motion, the motor 160 further drives the lead screw 120 to rotate towards a rotation direction, and drives the screw nut seat 130 and the movable base 220 together to move reciprocally towards an axial direction of the lead screw 120 (that is, a direction parallel to the guide rails 210). During the movement of the screw nut seat 130 and the movable base 220, a cooling structure (that is, the outer sleeve 152 enables the channel 1519 to be formed into a sealed space and the cooling medium is injected into the channel) of the connecting assembly 150 dissipates the heat of the feed drive mechanism 100, so as to quickly and uniformly dissipate a great amount of heat energy generated in the actuating process of the feed drive mechanism 100, thereby preventing a heat error of the screw nut seat 130 caused by a high temperature, and greatly improving a feeding accuracy of the feed drive mechanism 100.

Referring to FIGS. 9 to 12, a connecting assembly 150 according to a second embodiment of the present invention comprises a main body 151 and an outer sleeve 152. The main body 151 has a connecting plate 1511 and an inner sleeve 1518. The connecting plate 1511 further has a first side surface 1512 and a second side surface 1513 opposite to each other. The inner sleeve 1518 is connected to the second side surface 1513 of the connecting plate 1511, and a channel 1519 surrounds an outer side surface of the inner sleeve 1518. The channel 1519 of this embodiment is in a spiral shape and surrounds the outer side surface of the inner sleeve 1518, such that the channel 1519 is uniformly distributed on the outer side surface of the inner sleeve 1518.

The connecting plate 1511 and the inner sleeve 1518 of the main body 151 of the present invention are configured into an integrally formed structure. However, persons skilled in the art may combine the connecting plate 1511 with the inner sleeve 1518 in a soldering manner or a screwing manner.

Referring to FIGS. 9 to 12, an inlet 1521 and an outlet 1522 are respectively opened on two opposite end portions of the outer sleeve 152, and are connected to a cooling medium temperature control device (not shown). The outer sleeve 152 is sleeved on the outer side surface of the inner sleeve 1518, and an inner diameter size of the outer sleeve 152 matches with an outer diameter size of the inner sleeve 1518. Thus, when the outer sleeve 152 is sleeved outside the inner sleeve 1518, an inner side surface of the outer sleeve 152 is attached to the outer side surface of the inner sleeve 1518, such that the channel 1519 on the inner sleeve 1518 is formed into a sealed space, and the channel 1519 only communicates with the inlet 1521 and the outlet 1522. The cooling medium temperature control device (not shown) injects the cooling medium into the channel 1519 via the inlet 1521, and the cooling medium flows back to the cooling medium temperature control device (not shown) via the outlet 1522, such that the cooling medium uniformly flows through the outer side surface of the inner sleeve 1518, thereby forming a complete cooling loop. Through a temperature control of the cooling medium temperature control device, a flow quantity or a flow speed of the cooling medium injected into the channel 1519 are correspondingly adjusted. The cooling medium of this embodiment may be cooling water, cooling oil, or compressed air, but the present invention is not limited here.

The outer sleeve 152 has a plurality of third fixing holes 1523, and the inner sleeve 1518 has a plurality of third combining holes 15181 corresponding to the third fixing holes 1523. A plurality of locking elements 170, for example, screw bolts, passes through the third fixing holes 1523 and is locked in the third combining holes 15181, such that the outer sleeve 152 is fixed on the inner sleeve 1518 without being loosed, thereby preventing the cooling medium from overflowing.

The connecting assembly 150 according to the second embodiment of the present invention further comprises two sealing parts 180 disposed on two opposite end surfaces of the outer sleeve 152. When the outer sleeve 152 is sleeved outside the inner sleeve 1518, the sealing parts 180 are embedded between the outer sleeve 152 and the inner sleeve 1518 and provide a sealing function, so as to avoid leakage of the cooling medium in the channel 1519. The sealing parts 180 of the present invention may be oil seals or O-rings, but the present invention is not limited here.

Figure 9:
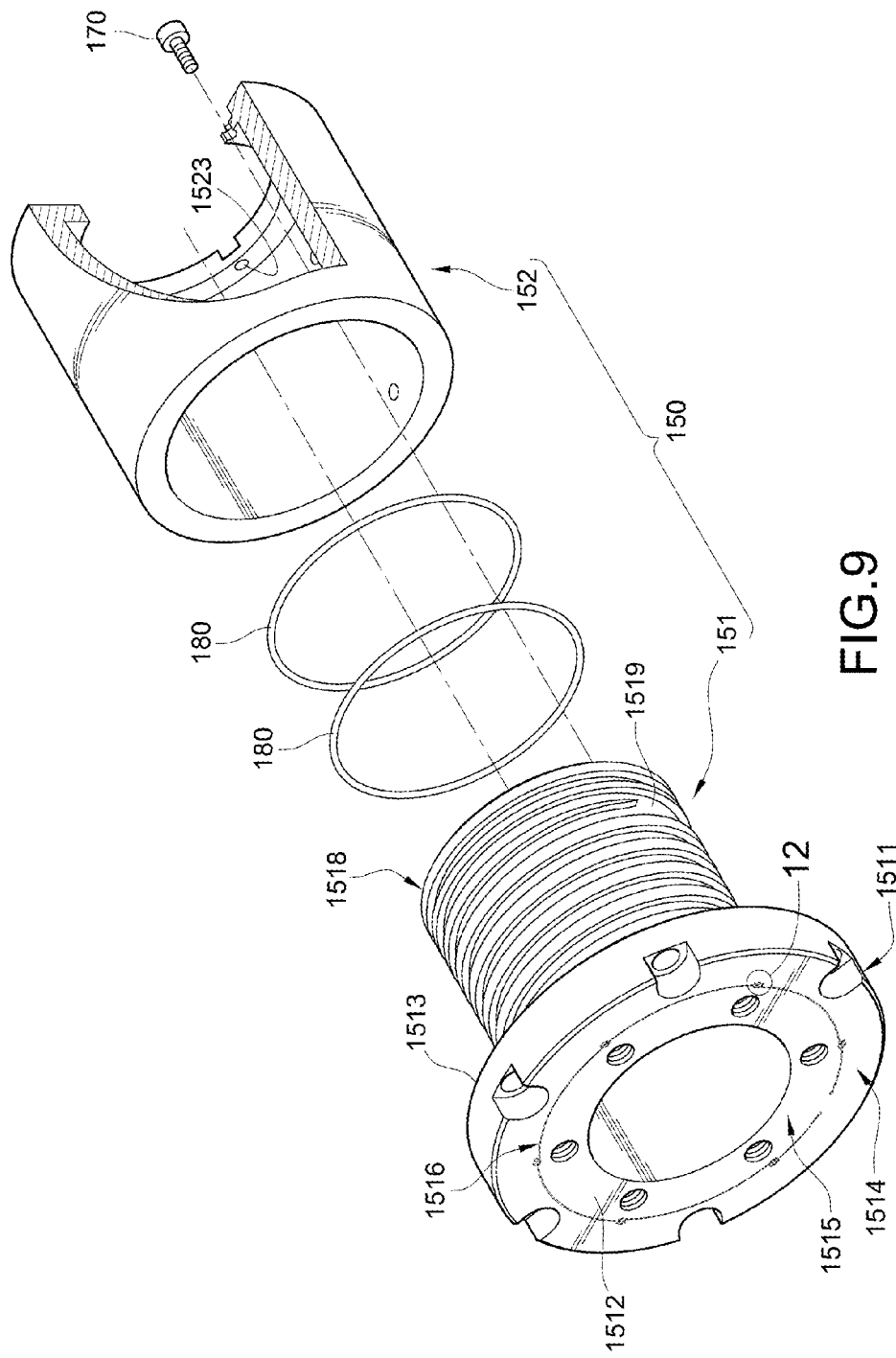
FIG. 9 is an exploded view of a connecting assembly according to a second embodiment of the present invention.
Figure 10:
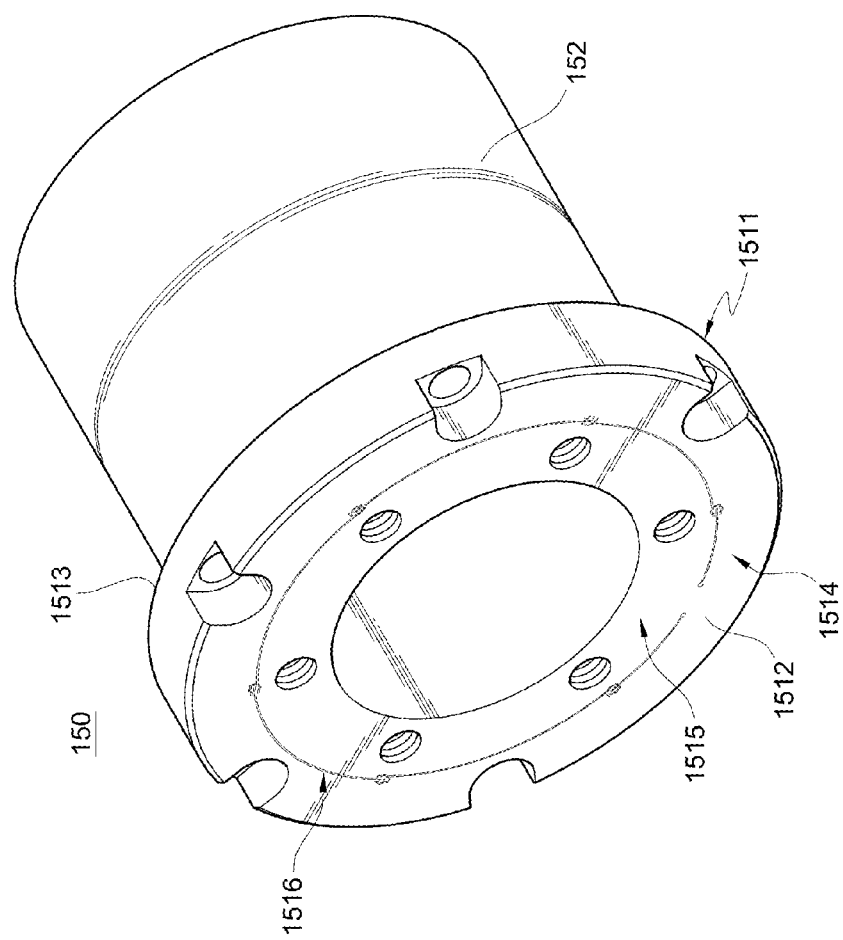
FIG. 10 is a schematic view of the connecting assembly according to the second embodiment of the present invention.
Figure 11:
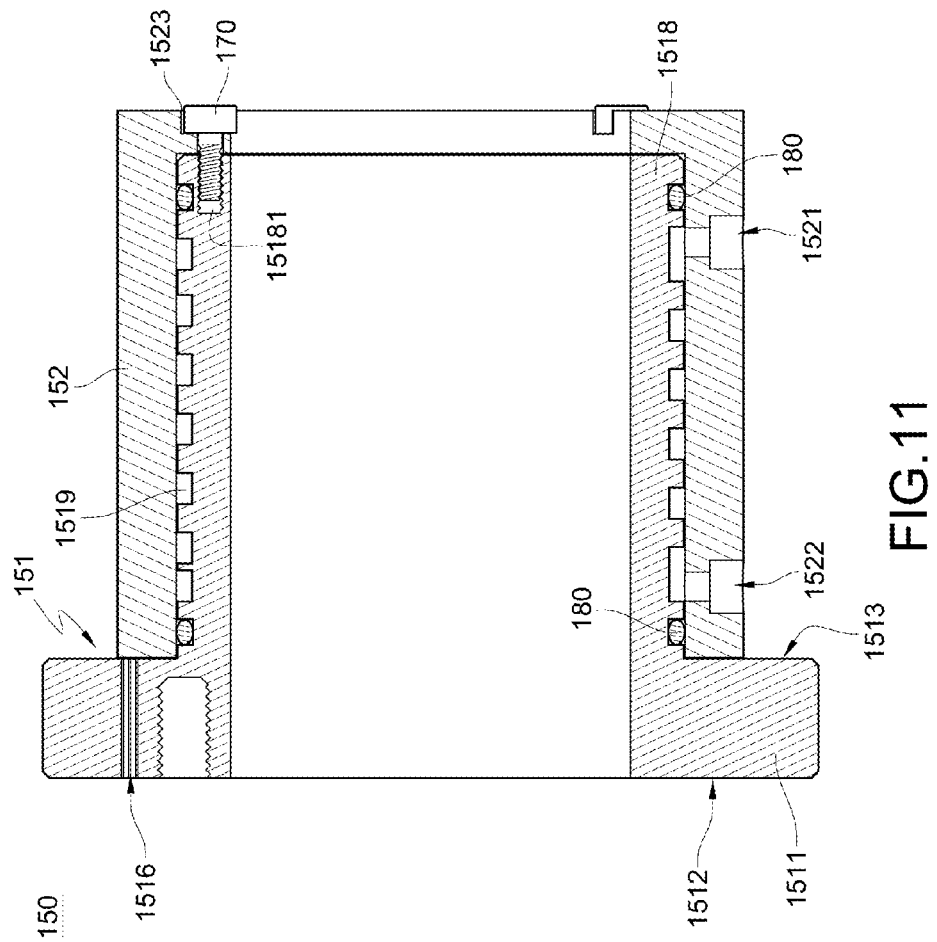
FIG. 11 is a schematic cross-sectional view of the connecting assembly according to the second embodiment of the present invention.
Figure 12:
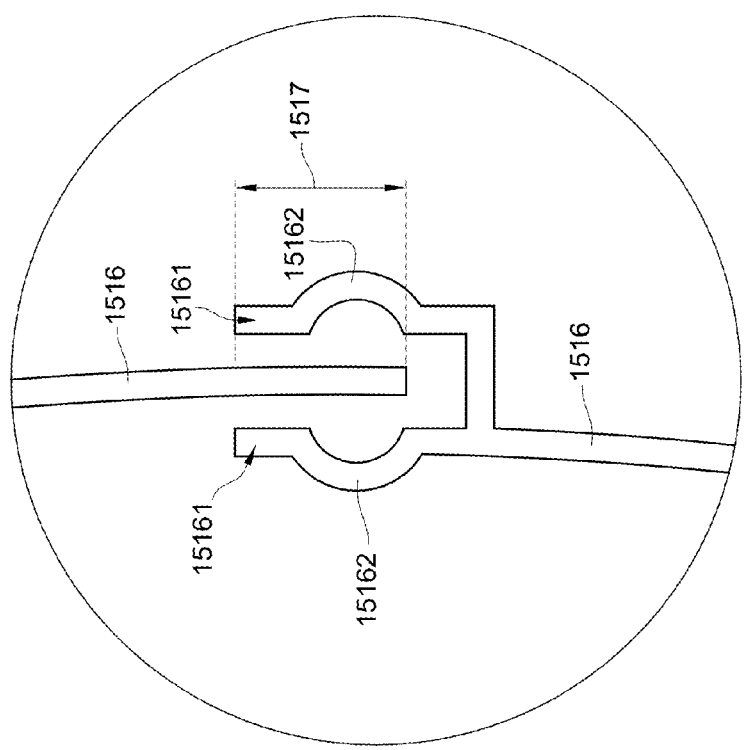
FIG. 12 is a schematic partially-enlarged view of elastic slots of a connecting plate according to the second embodiment of the present invention.

Referring to FIGS. 9 and 12, the connecting plate 1511 according to the second embodiment of the present invention has a plurality of axially penetrating elastic slots 1516, and the connecting plate 1511 is divided by the elastic slots 1516 into a first portion 1514 located on an outer edge and a second portion 1515 located on an inner edge, such that the elastic slots 1516 are located between the first portion 1514 and the second portion 1515. The elastic slots 1516 are separated from one another, such that the first portion 1514 is connected to the second portion 1515, and each elastic slot 1516 is symmetrically disposed around a circle center of the connecting plate 1511, so as to serially form an annular linear structure.

One ends of two neighboring elastic slots 1516 respectively have an overlapped laminating segment 1517. The laminating segment 1517 of one of the neighboring elastic slots 1516 further has two opposite elastic arms 15161 that are connected to each other, and the two elastic arms 15161 have a distance there-between. The laminating segment 1517 of the other one of the neighboring elastic slots 1516 is located between the two elastic arms 15161, so as to form a hinge structure. The two elastic arms 15161 further have a circular arc segment 15162 respectively, such that the elastic arms 15161 have an effect of absorbing shaking energy. Through the above structure of the elastic slots 1516, the entire structure of the connecting assembly 150 has the elastic deforming characteristic in a radial direction.

It should be noted that, the elastic slots 1516 of the present invention are formed through a wire-cut electrical discharge machining (WEDM), and the slot width of the elastic slots 1516 and the structure design of the laminating segments 1517 of the two neighboring elastic slots 1516 may absorb the deformation resulting from the assembly errors. Furthermore, merely one hinge structure formed by the elastic arms 15161 and the elastic slots 1516 is required, so as to enable the connecting plate 1511 to have the elastic deforming capability in the radial direction. However, according to a practical using state and demands, a size, a quantity, and a disposing position of the hinge structure may be correspondingly adjusted, but the present invention is not limited to the embodiment in which the elastic slots 1516 and the hinge structure are symmetrically disposed around the circle center of the connecting plate 1511.

Figure 13:
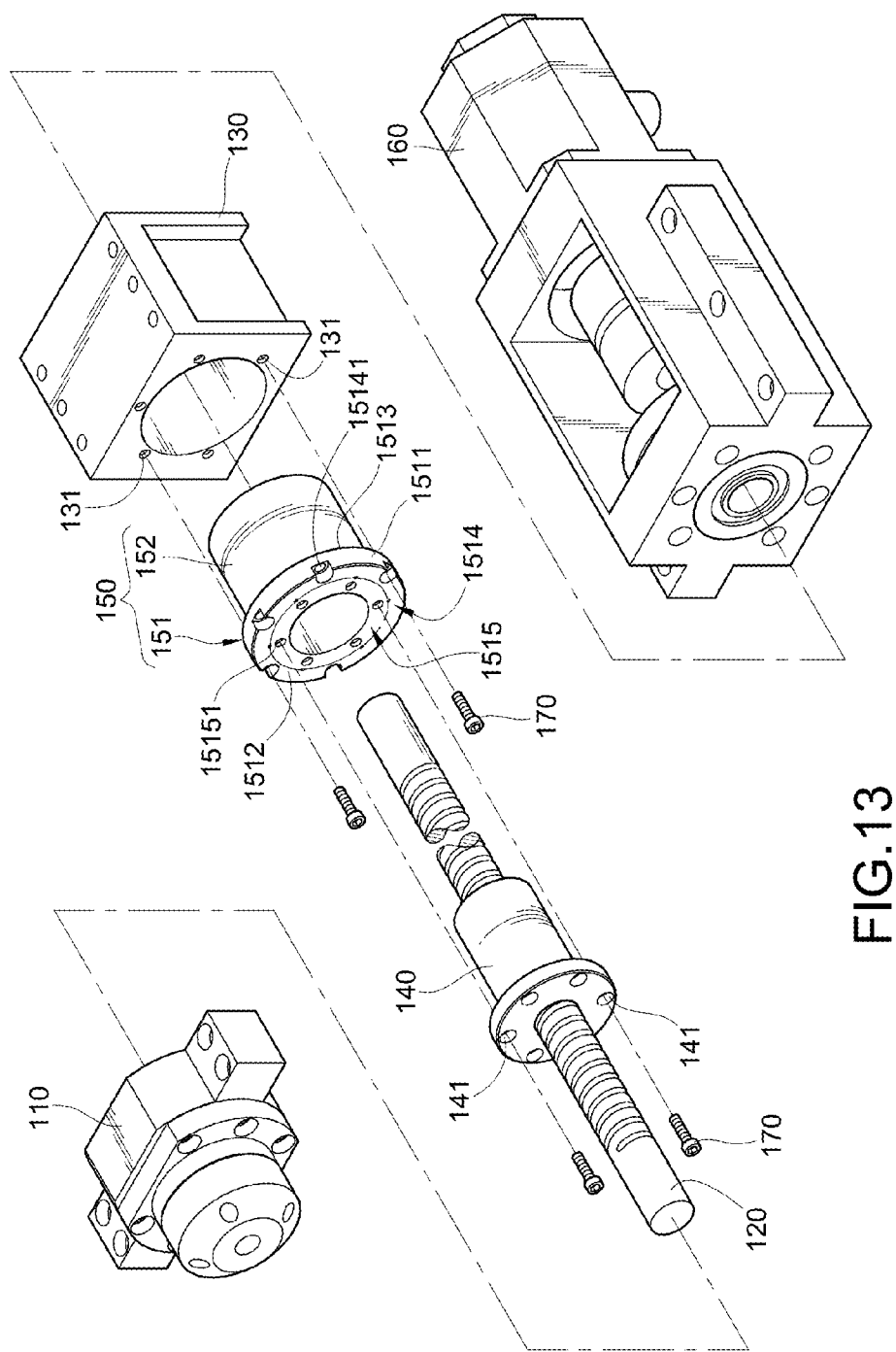
FIG. 13 is an exploded view of a feed drive mechanism according to the second embodiment of the present invention.
Figure 14:
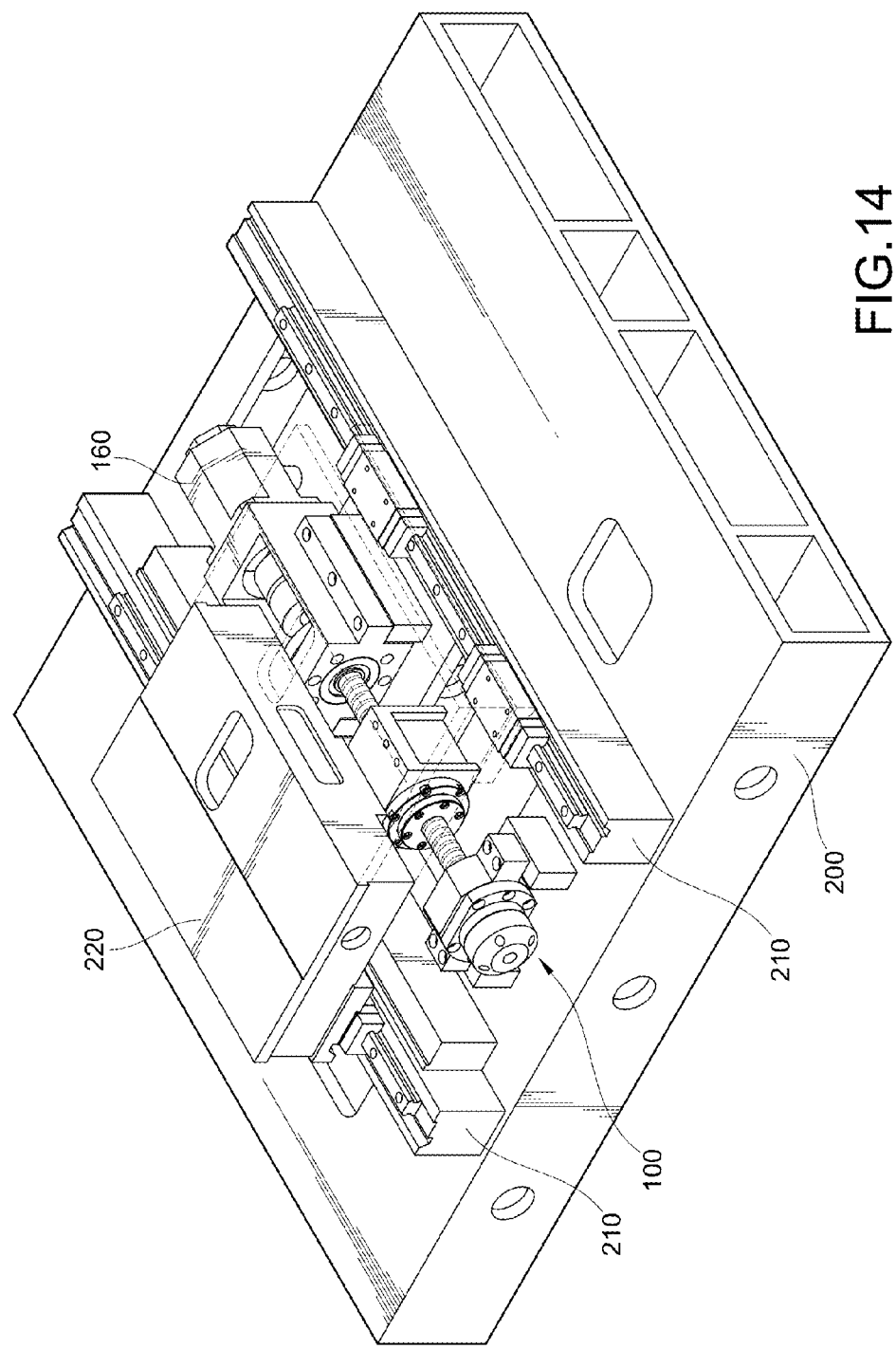
FIG. 14 is a schematic view of the feed drive mechanism according to the second embodiment of the present invention.

FIGS. 13 and 14 are schematic three-dimensional views of a feed drive mechanism according to the second embodiment. Referring to FIGS. 13 and 14, a feed drive mechanism 100 according to the second embodiment of the present invention is installed on a base 200, in which the base 200 may be a saddle of a comprehensive processing machinery table. The base 200 further includes guide rails 210 neighboring to the feed drive mechanism 100 and a movable base 220 connected to the feed drive mechanism 100. The movable base 220 is disposed on the guide rails 210 in a movable relation and moves reciprocally relative to the base 200.

Referring to FIGS. 13 and 14, the feed drive mechanism 100 according to the second embodiment of the present invention comprises a bearing tailstock 110, a lead screw 120, a screw nut seat 130, a lead screw nut 140, a connecting assembly 150, and a motor 160. The bearing tailstock 110 is fixed on the base 200. One end of the lead screw 120 is disposed on the bearing tailstock 110, and the other end of the lead screw 120 is connected to the motor 160, in which a disposing direction of the lead screw 120 is parallel to the guide rails 210 and a moving direction of the movable base 220. The screw nut seat 130 is movably sleeved on the lead screw 120, and is combined with the movable base 220. The lead screw nut 140 is disposed in the screw nut seat 130 and movably sleeved on the lead screw 120, and one end of the lead screw nut 140 is exposed out of the screw nut seat 130. The connecting assembly 150 is sleeved on the lead screw 120, and two side surfaces 1512 and 1513 of the connecting assembly 150 are respectively attached to the screw nut seat 130 and the lead screw nut 140.

Referring to FIGS. 13 and 14, the first portion 1514 of the connecting plate 1511 of the connecting assembly 150 divided by the elastic slots 1516 has a plurality of first fixing holes 15141, and the screw nut seat 130 has a plurality of first combining holes 131 corresponding to the first fixing holes 15141. The plurality of locking elements 170, for example, screw bolts, respectively passes through the first fixing holes 15141 and is locked in the first combining holes 131, such that the connecting plate 1511 is axially fixed on the screw nut seat 130. The second portion 1515 divided by the elastic slots 1516 has a plurality of second fixing holes 15151, and the lead screw nut 140 has a plurality of second combining holes 141 corresponding to the second fixing holes 15151. The plurality of locking elements 170, for example, screw bolts, respectively passes through the second fixing holes 15151 and is locked in the second combining holes 141, such that the lead screw nut 140 is axially fixed on the connecting plate 1511.

It should be noted that, in the combining means of the present invention, the first portion 1514 of the second side surface 1513 of the connecting plate 1511 is combined with the screw nut seat 130, and the second portion 1515 of the first side surface 1512 of the connecting plate 1511 is combined with the lead screw nut 140, so that the connecting assembly 150 is axially fixed between the screw nut seat 130 and the lead screw nut 140. Persons skilled in the art may design various different combining means to fix the connecting assembly 150 between the screw nut seat 130 and the lead screw nut 140, and the present invention is not limited here.

A thickness of the connecting plate 1511 of the present invention is approximately 10 mm to 30 mm, such that it can be installed in any type of lead screw feeding mechanisms, and is not limited to the feed drive mechanism 100 of the present invention.

Referring to FIGS. 13 and 14, in the driving motion, the motor 160 further drives the lead screw 120 to rotate towards a rotation direction, and drives the screw nut seat 130 and the movable base 220 together to move reciprocally towards an axial direction of the lead screw 120 (that is, a direction parallel to the guide rails 210). During the movement of the screw nut seat 130 and the movable base 220, the connecting plate 1511 attached to the screw nut seat 130 has the elastic deforming capability in the radial direction through the elastic slots 1516. Particularly, in the feed drive mechanism 100, by using the plurality of averagely distributed laminating segments 1517 of the elastic slots 1516, when the lead screw 120 moves reciprocally, the hinge structure formed by two elastic arms 15161 of one elastic slot 1516 and the laminating segment 1517 of another neighboring elastic slot 1516 provides the elastic deforming capability. The elastic slots 1516 axially penetrate the connecting plate 1511, so as to maintain certain high rigidity capability in the axial direction of the connecting plate 1511, which is sufficient for surely driving the feed drive mechanism 100 to move without being deformed. Meanwhile, during the movement of the screw nut seat 130 and the movable base 220, a cooling structure (that is, the outer sleeve 152 enables the channel 1519 to be formed into a sealed space and the cooling medium is injected into the channel) of the connecting assembly 150 dissipates the heat for the feed drive mechanism 100, so as to quickly and uniformly dissipate a great amount of heat energy generated in the actuating process of the feed drive mechanism 100, thereby preventing a heat error of the screw nut seat 130 caused by a high temperature, and greatly improving a feeding accuracy of the feed drive mechanism 100.

Figure 15A:
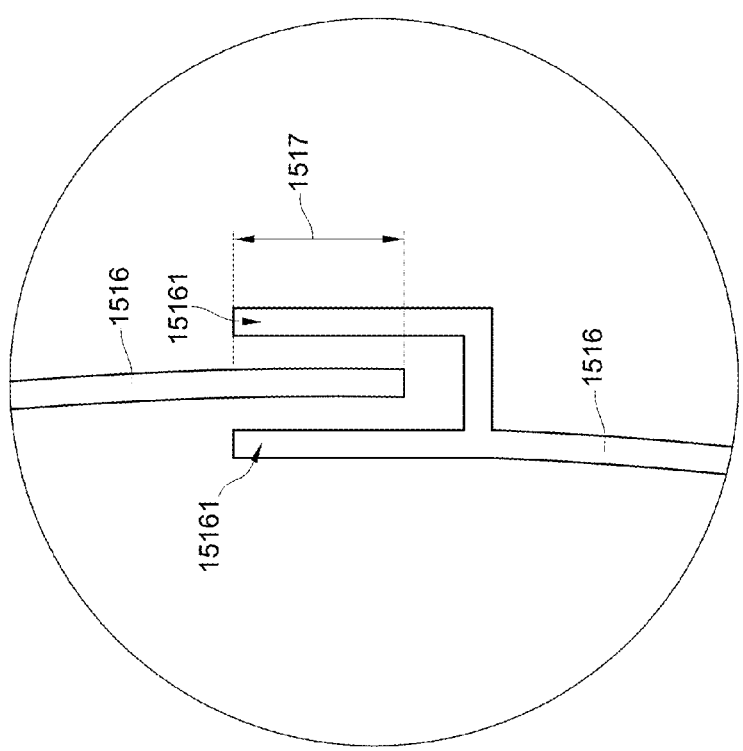
FIG. 15A is a schematic partially-enlarged view of the elastic slots in different types according to the second embodiment of the present invention.
Figure 15B:
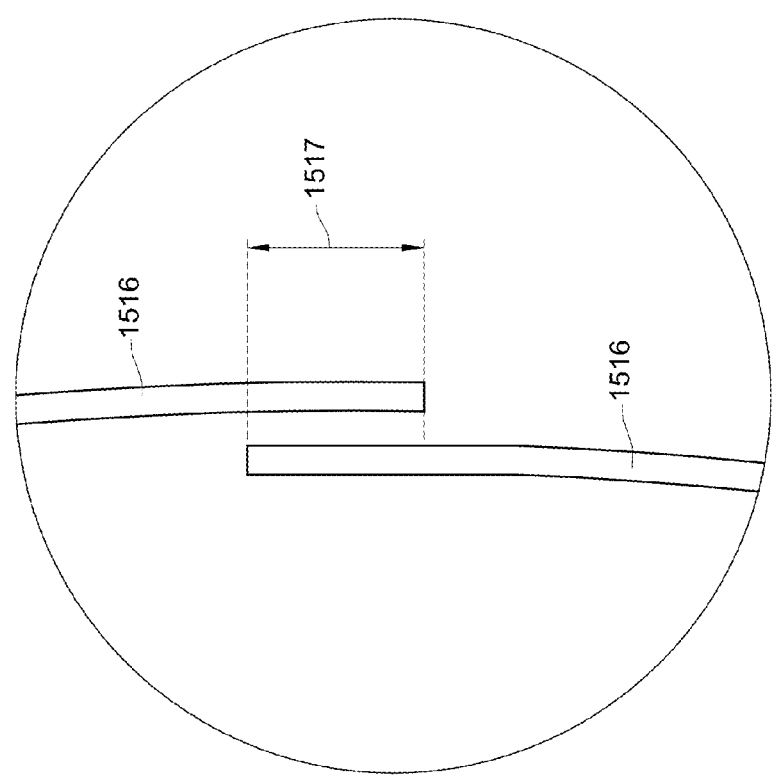
FIG. 15B is a schematic partially-enlarged view of the elastic slots in different types according to the second embodiment of the present invention.

FIGS. 15A and 15B are schematic partially-enlarged views of different types of elastic slots of the connecting plate according to the second embodiment of the present invention.

Referring to FIG. 15A, the laminating segment 1517 of one of the neighboring elastic slots 1516 has two opposite elastic arms 15161 that are connected to each other, and the two elastic arms 15161 are disposed in parallel and spaced apart from each other by a distance. The laminating segment 1517 of the other one of the neighboring elastic slots 1516 is located between the two elastic arms 15161, so as to form the hinge structure. The type of the elastic arms 15161 in FIG. 15A do not have circular arc segments (as shown in FIG. 12), but the entire structure of the connecting plate 1511 still has the elastic deforming characteristic in the radial direction.

Referring to FIG. 15B, the laminating segments 1517 of the two neighboring elastic slots 1516 of the present invention are relatively overlapped, and no elastic arms or circular arc segments (as shown in FIG. 12) are formed at the laminating segment 1517 of one of the elastic slots 1516. However, the connecting plate 1511 still has the elastic deforming characteristic in the radial direction through the relatively overlapped laminating segments 1517 of the elastic slots 1516. However, the elastic slots 1516 of the present invention may be further designed into various different overlapping types, and the present invention is not limited to the above types.

Figure 16:
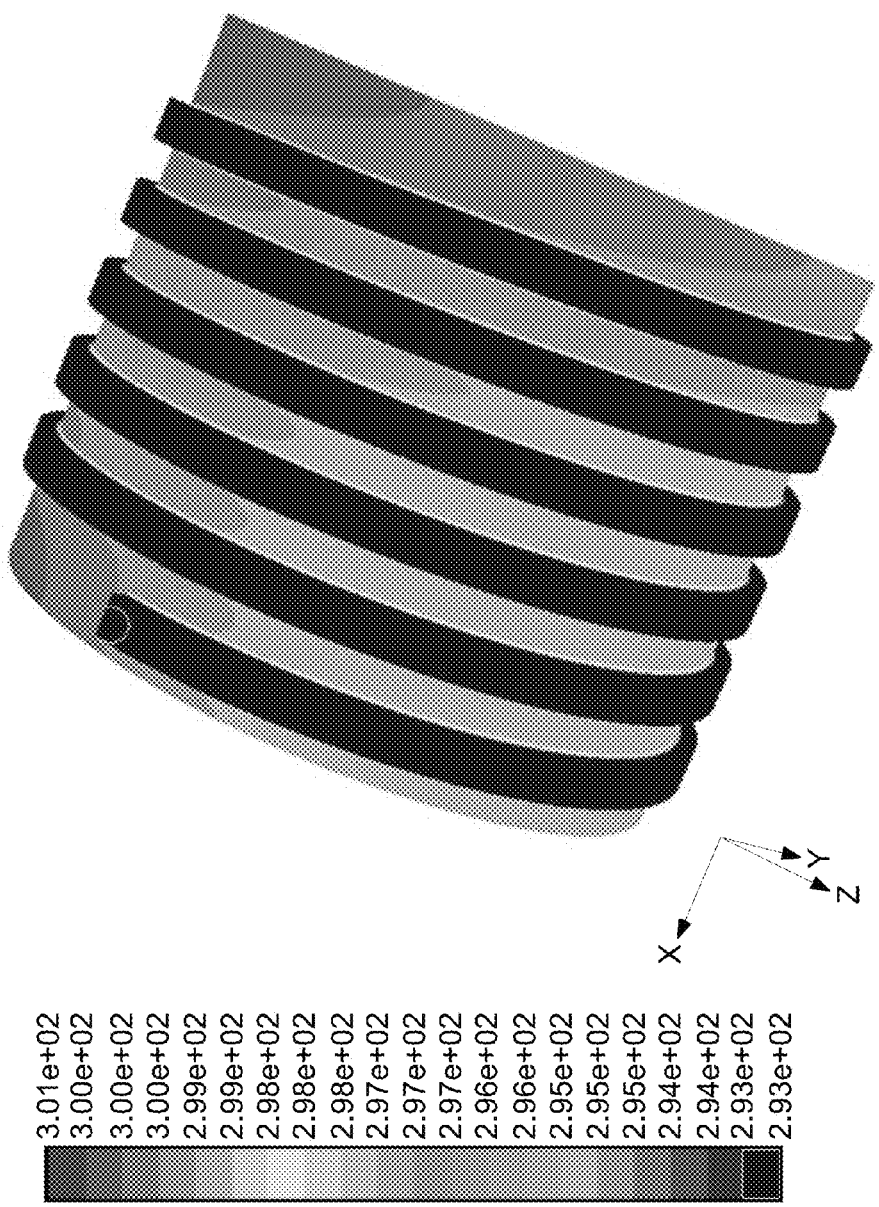
FIG. 16 is a schematic analysis view of a cooling channel of the connecting assembly according to the present invention.
Figure 17:
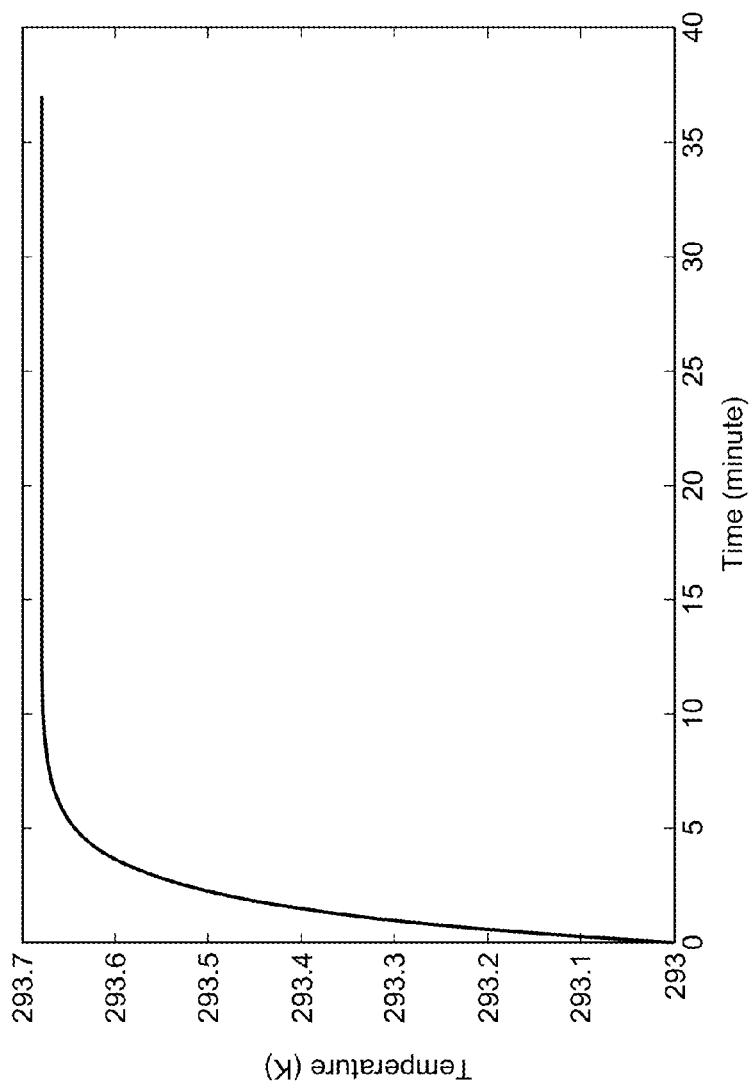
FIG. 17 is a temperature-time curve diagram of a cooling medium at an outlet end of the connecting assembly according to the present invention.

FIG. 16 is a schematic analysis view of a cooling channel of the connecting assembly according to the present invention, and FIG. 17 is a temperature-time curve diagram of a cooling medium at an outlet end of the connecting assembly according to the present invention.

As known from the drawings, under conditions of a given heat generation rate of a heat source and a given flow speed of a cooling medium, as the main body is continuously heated, a temperature variation of the cooling medium at the outlet end of the outer sleeve is maintained within 0.7 degrees (the temperature in the drawing is an absolute temperature (K)), which represents that the cooling medium in the channel enables the connecting assembly to maintain a stable working temperature, so that the channel design of the present invention surely dissipates the heat of the connecting assembly effectively.

Figure 18:
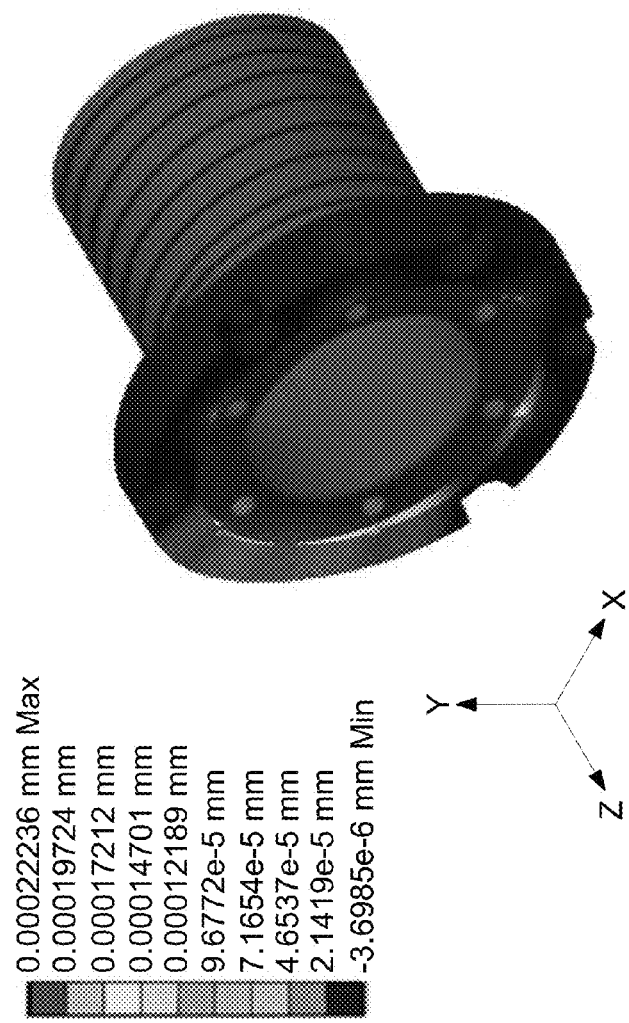
FIG. 18 is a schematic view of rigidity simulation analysis of a main body of the connecting assembly according to the present invention in a Z axis direction.
Figure 19:
FIG. 19 is a schematic view of rigidity simulation analysis of the main body of the connecting assembly according to the present invention in an X axis direction.
Figure 19:
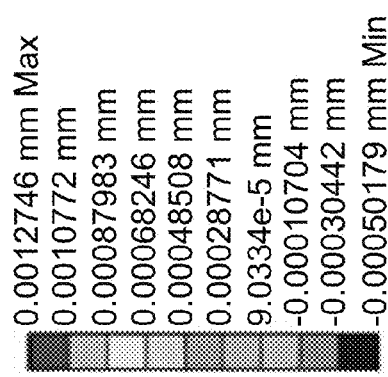
Figure 19:
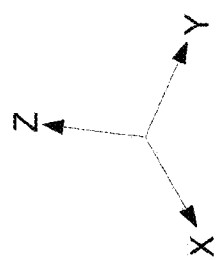
Figure 20:
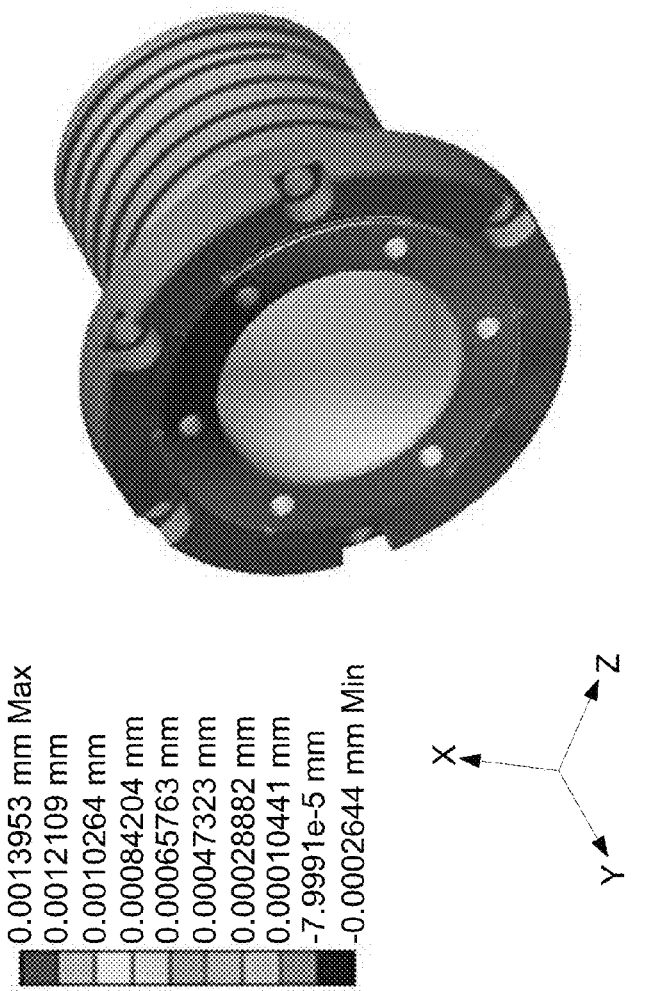
FIG. 20 is a schematic view of rigidity simulation analysis of the main body of the connecting assembly according to the present invention in a Y axis direction.

FIGS. 18 to 20 are schematic views of rigidity simulation analysis of the main body according to the present invention. Referring to FIGS. 18 to 20, a deformation amount of the main body of the connecting assembly in the axial direction (as shown in FIG. 18) is approximately 0.2 µm, and a deformation amount of the main body of the connecting assembly in the radial direction (as shown in FIGS. 19 and 20) is approximately 1.2 µm to 1.4 µm. Thus, it may be known that, a rigidity strength of the main body of the connecting assembly in the axial direction is greater than that in the radial direction, such that the design of the elastic slots of the present invention surely achieves the function of enabling the connecting assembly to have the preferred elastic deforming capability in the radial direction.

The connecting assembly of the present invention is fixed and attached between the screw nut seat and the lead screw nut of the feed drive mechanism. Through the hinge structure formed by the penetrating elastic slots, the connecting plate has the elastic deforming capability in the radial direction, so as to repair a sealing degree between the screw nut seat and the lead screw nut, thereby effectively modifying the non-parallelism of the feed drive mechanism resulting from the assembly errors, and preventing the problems of, for example, micro-feed stick-slip and dead weight droop of the lead screw, thereby improving the feeding accuracy of the feed drive mechanism. Furthermore, the cooling structure is directly designed on the connecting assembly, such that the entire structure design is quite simple, it is easily manufactured through mass production, and the lead screw nut maintains a size and a type of an original specification product, so as to improve the assembly and interchangeability features of the feed drive mechanism, which is convenient for the subsequent maintenance and replacement of parts.

In addition, the connecting assembly has a certain high rigidity capability in the axial direction, so as to effectively resist a stress generated when the feed drive mechanism is driven, and the cooling structure of the connecting assembly and the elastic slots of the connecting plate are easily processed, such that a manufacturing cost is rather low, and a processing accuracy of a mechanical processing table mounted with the connecting assembly of the present invention is greatly increased, thereby further improving a value and a production capacity of the mechanical processing table.

What is claimed is:

1. A connecting assembly, applicable to a feed drive mechanism having a lead screw nut and a screw nut seat, the connecting assembly comprising:
   a main body, having a connecting plate and an inner sleeve, wherein the connecting plate has a first side surface and a second side surface opposite to each other, the first side surface and the second side surface are respectively fixed on the lead screw nut and the screw nut seat, the inner sleeve is connected to the second side surface, and a channel surrounds an outer side surface of the inner sleeve, wherein the connecting plate further comprises:
- a first portion, fixed on the screw nut seat;
- a second portion, connected to the first portion in a radial direction, and fixed on the lead screw nut; and
- a plurality of elastic slots, located between the first portion and the second portion, and axially penetrating the connecting plate to allow for the second portion to deform in the radial direction, wherein the neighboring elastic slots respectively have laminating segments; and an outer sleeve, sleeved on the outer side surface of the inner sleeve, wherein the outer sleeve enables the channel to be formed into a sealed space, and has an inlet and an outlet respectively communicating with the channel.

2. The connecting assembly according to claim 1, wherein the laminating segment of one of the neighboring elastic slots further has two opposite elastic arms, and the laminating segment of the other one of the neighboring elastic slots is located between the two elastic arms.

3. The connecting assembly according to claim 2, wherein each of the two elastic arms further has a circular arc segment.

4. The connecting assembly according to claim 2, wherein the elastic slots are separated from one another, such that the first portion is connected to the second portion.

5. The connecting assembly according to claim 2, wherein the elastic slots are annularly arranged on the connecting plate.

6. The connecting assembly according to claim 1, wherein the channel surrounds the outer side surface of the inner sleeve in a spiral-shaped configuration.

7. The connecting assembly according to claim 1, wherein the channel surrounds the outer side surface of the inner sleeve in a repeated folded configuration.

8. The connecting assembly according to claim 7, wherein the channel further comprises a plurality of expansion portions.

9. The connecting assembly according to claim 1, further comprising two sealing parts, wherein the sealing parts are disposed on two opposite end surfaces of the outer sleeve.

10. A feed drive mechanism, comprising:
- a bearing tailstock;
- a lead screw, having one end disposed on the bearing tailstock;
- a screw nut seat, movably sleeved on the lead screw;
- a lead screw nut, disposed in the screw nut seat, movably sleeved on the lead screw, and having one end exposed out of the screw nut seat;
- a motor, connected to the other end of the lead screw, for driving the lead screw to rotate and driving the screw nut seat to move reciprocally; and
- a connecting assembly, comprising:
  - a main body, having a connecting plate and an inner sleeve, wherein the connecting plate has a first side surface and a second side surface opposite to each other, the first side surface and the second side surface are respectively fixed on the lead screw nut and the screw nut seat, the inner sleeve is connected to the second side surface, and a channel surrounds an outer side surface of the inner sleeve, wherein the connecting plate further comprises:
    - a first portion, fixed on the screw nut seat;
    - a second portion, connected to the first portion in a radial direction, and fixed on the lead screw nut; and
    - a plurality of elastic slots, located between the first portion and the second portion, and axially penetrating the connecting plate to allow for the second portion to deform in the radial direction, wherein the neighboring elastic slots respectively have laminating segments; and
  - an outer sleeve, sleeved on the outer side surface of the inner sleeve, wherein the outer sleeve enables the channel to be formed into a sealed space, and has an inlet and an outlet respectively communicating with the channel.

11. The feed drive mechanism according to claim 10, wherein the laminating segment of one of the neighboring elastic slots further has two opposite elastic arms, and the laminating segment of the other one of the neighboring elastic slots is located between the two elastic arms.

12. The feed drive mechanism according to claim 11, wherein each of the two elastic arms further has a circular arc segment.

13. The feed drive mechanism according to claim 10, wherein the elastic slots are separated from one another, such that the first portion is connected to the second portion.

14. The feed drive mechanism according to claim 10, wherein the elastic slots are annularly arranged on the connecting plate.

15. The feed drive mechanism according to claim 10, wherein the channel surrounds the outer side surface of the inner sleeve in a spiral-shaped configuration.

16. The feed drive mechanism according to claim 10, wherein the channel surrounds the outer side surface of the inner sleeve in a repeated folded configuration.

17. The feed drive mechanism according to claim 16, wherein the channel further comprises a plurality of expansion portions.

18. The feed drive mechanism according to claim 10, further comprising two sealing parts, wherein the sealing parts are disposed on two opposite end surfaces of the outer sleeve.

* * * * *